United States Patent [19]

Klink

[11] Patent Number: 5,296,921
[45] Date of Patent: Mar. 22, 1994

[54] TWO PORT NETWORK WITH SHARED ELEMENTS FOR COMBINING AND FILTERING LUMA AND CHROMA COMPONENTS TO FORM COMPOSITE VIDEO SIGNAL

[75] Inventor: Kristopher A. Klink, Fishers, Ind.

[73] Assignee: Thomson Consumer Electronics, Inc., Indianapolis, Ind.

[21] Appl. No.: 945,832

[22] Filed: Sep. 16, 1992

[51] Int. Cl.$^5$ .............................................. H04N 9/64
[52] U.S. Cl. ..................... 348/711; 348/571; 348/624
[58] Field of Search ............... 358/21, 38, 39, 40, 358/36, 167, 22, 37, 166; H04N 5/46, 9/64

[56] References Cited

U.S. PATENT DOCUMENTS

| | | | |
|---|---|---|---|
| 2,895,004 | 7/1959 | Fredendall | 358/38 |
| 3,728,476 | 4/1973 | Bates et al. | 358/31 X |
| 4,558,348 | 12/1985 | Bolger et al. | 358/13 X |
| 4,664,387 | 2/1987 | Bell et al. | 358/21 R |
| 4,689,663 | 8/1987 | Bell et al. | 358/21 R |

Primary Examiner—Mark R. Powell
Assistant Examiner—John W. Miller
Attorney, Agent, or Firm—Joseph S. Tripoli; Peter M. Emanuel; Richard G. Coalter

[57] ABSTRACT

A network combines luminance and chrominance signals to provide a composite video signal wherein the chrominance signal is subjected to band pass filtering to reject low frequency noise and the luminance signal is subjected to filtering by a predetermined amount at the color subcarrier frequency to reject color dots. In a preferred implementation, the filter is realized with only one inductor and one capacitor thereby preventing displayed artifacts with the economic and reliability benefits of minimal parts count.

12 Claims, 1 Drawing Sheet

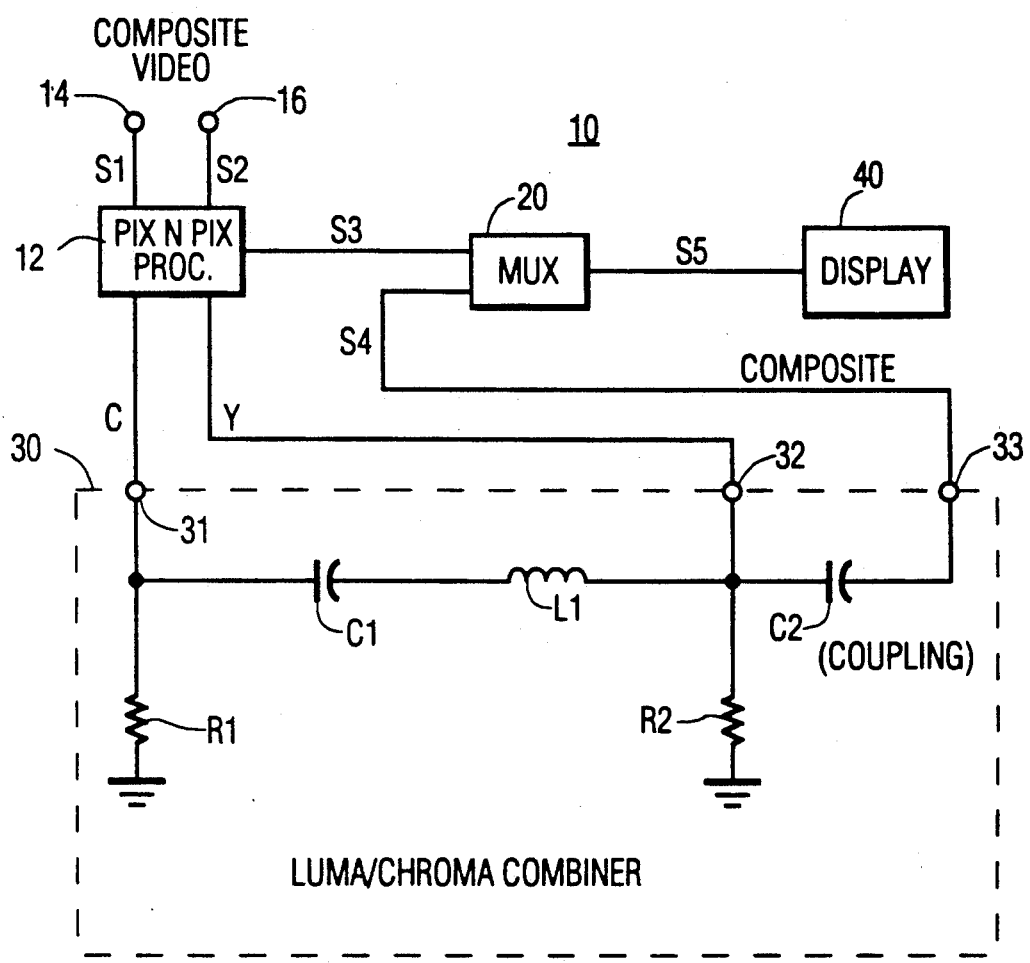

TWO PORT NETWORK WITH SHARED ELEMENTS FOR COMBINING AND FILTERING LUMA AND CHROMA COMPONENTS TO FORM COMPOSITE VIDEO SIGNAL

FIELD OF THE INVENTION

This invention relates to color television receivers and particularly to circuits for combining luma and chroma components in color television receivers.

BACKGROUND OF THE INVENTION

In television receivers there is generally a sequence of separation of video signals. For example, an RF signal is detected, demodulated to provide a baseband signal. The baseband composite signal is again processed to provide luminance and chrominance signals. The chrominance signals are demodulated to provide color difference signals. After processing the baseband luminance signal and the color difference signals are converted to a final form for display, such as RGB.

In a picture-in-picture processor it is some times advantageous to provide inputs in composite form and to provide outputs in a mixed format, e.g., composite for the big picture and component for the inset or little picture. To combine these signals with a fast (multiplex) switch for further processing and display, it is necessary to first combine the components to composite form. The direct approach of simply summing the luminance and chrominance components, however, results in certain artifacts being produced in the inset picture.

SUMMARY OF THE INVENTION

One of the problems with summing luminance and chrominance signals after picture in picture processing, or, in a more general sense, after some other type of processing, has been discovered to be related to noise effects. More specifically, in accordance with a first aspect of the invention, it has been found that the low frequency noise may be present in the small picture chrominance output signal generated by the digital processing (aliasing components). This noise has been found to produce large dots on the picture in picture display similar to 3.58 MHz dots evident in non-comb filter receivers. The need for rejection of the noise component along with rejection of the 3.58 MHz subcarrier in the luminance output and attenuation of high frequency clock harmonics has led to the design of a processing filter described herein.

The solution to this problem, in accordance with the invention, comprises combining the luminance and chrominance signals as described herein to sum the luminance and chrominance signals so as to (1) reject low frequency (less than 2 MHz) noise from the chrominance signal and (2) provide a small (e.g., 6 dB) 3.58 MHz (color subcarrier) notch for the luminance signal.

In a preferred embodiment of the invention, the foregoing objects are achieved in a minimal parts count network employing the same LC (inductance capacitance) circuit to perform both the low frequency rejection and the desired band pass characteristic for the luminance component.

BRIEF DESCRIPTION OF THE DRAWING

The invention is illustrated in the accompanying drawing wherein the sole FIGURE illustrates a television system with a luminance chrominance combiner embodying the invention.

DETAILED DESCRIPTION

The receiver 10 of the sole FIGURE includes a picture in picture processor 12 having inputs 14 and 16 for receiving main and inset composite video input signals S1 and S2. Processor 12, of conventional design, outputs the main picture video signal S3 in component form and outputs the inset picture in composite form as a luminance component Y and a chrominance component C. The Y and C components are combined, in accordance with the invention, by a luminance chrominance signal combiner 30 (outlined in phantom) and the resultant composite video signal S4 is applied along with the main picture signal S3 to a multiplex switch 30 to form a picture in picture signal S5 for further processing and display by means of a processing and display unit 30.

The luminance 1 chrominance combiner 30 comprises input terminals 31 and 32 for receiving, respectively, the chrominance and luminance signals C and Y to be combined and an output terminal 33 for providing the combined output composite signal S4. Within unit 30 the chrominance input terminal 31 is coupled to ground via a first resistor R1 and is coupled to terminal 32 via a series connection of a capacitor C1 and an inductor L1. Terminal 32 is also coupled to ground via a load resistor R2 and to the output terminal 33 via a further capacitor C2.

Exemplary values of the foregoing components are as follows:

| | |
|---|---|
| R1 | 270 Ohms |
| C1 | 33 pico-Farads |
| L1 | 56 micro-Henrys |
| R2 | 390 Ohms |
| C2 | 150 pico-Farads |

For the exemplary values given (intended for NTSC standard television signals) the filter provides a notch of about 7.75 dB at the color subcarrier frequency of about 3.58 MHz for the chrominance component. The Q of the bandpass is approximately unity (one) with a delay of about 170 nano-seconds. An important advantage of the filter shown is that it uses the same LC (inductance capacitance) elements to perform both of the desired frequency response characteristics (e.g., the color notch as to the luminance component and the low frequency rejection below 2 MHz of the chrominance signal 1. To summarize, the overall effect of the network 30 is to provide a combined (composite) output signal in which the luminance component is notched by about 7.75 dB at the color subcarrier frequency and the color component is band pass filtered so as to reject low frequency luma noise thereby solving the problem of video artifacts being produced by combining the signals directly.

Advantageously, the network 30 only requires a pair of load resistors, one inductor and one capacitor (the second capacitor is a coupling capacitor). The economic benefits of this arrangement are clearly evident as compared with using separate filters which might even require further processing for delay compensation.

Various changes and modifications may be made to the embodiment of the invention herein shown and described. For example, for PAL standard signals the color subcarrier notch should be at the PAL color subcarrier frequency. Also, the invention is of general application and may be used with video sources other than picture in picture processors.

What is claimed is:

1. A luminance chrominance signal combining circuit for combining a luminance component input signal with a chrominance component input signal to form a combined output signal and comprising:
   first means for providing a filtering characteristic for reducing low frequency noise in said chrominance component signal to be combined;
   second means for providing a filtering characteristic for reducing the amplitude of said luminance component input signal at the color subcarrier frequency by a predetermined amount;
   and third means for combining the outputs of said filters to form said combined output signal in a given video format; and wherein:
   said first, second and third means comprise a two port network having respective ports to which said component signals are applied,
   said two port network including shared network elements for providing both of said filtering characteristics and the function of said combining means; and wherein:
   said combined output signal is of a composite video format obtained from a common port to which one of said luminance and chrominance component signals is applied.

2. A network, for combining a luminance component input signal with a chrominance component input signal to form a composite video output signal in which the luminance component thereof is attenuated at the chrominance subcarrier frequency and the chrominance component thereof is attenuated at relatively low frequencies, said network comprising:
   a first terminal for receiving said chrominance component input signal;
   a second terminal for receiving said luminance component input signal;
   a respective resistor coupled between each port and a point of reference potential;
   an inductor and a capacitor coupled in series between said ports; and
   output means for deriving said composite video output signal from a selected one of said terminals.

3. A network as recited in claim 2 wherein said selected one of said terminals comprises said second terminal.

4. A network as recited in claim 2 wherein said output means comprises a coupling capacitor coupled between said second terminal and an input of a utilization means.

5. A network as recited in claim 2 further comprising:
   signal source means for providing a further composite video output signal; and
   switch means for selectively applying said first named composite video output signal and said further composite video output signal to a utilization means.

6. A method, for combining a luminance component input signal with a chrominance component input signal to form a composite video output signal in which the luminance component thereof is attenuated at the chrominance subcarrier frequency and the chrominance component thereof is attenuated at relatively low frequencies, said method comprising:
   providing a first terminal for receiving said chrominance component input signal;
   providing a second terminal for both receiving said luminance component input signal and providing said composite video output signal;
   coupling a respective resistor between each terminal and a point of reference potential; and
   coupling an inductor and a capacitor in series between said terminals.

7. A method as recited in claim 6 further comprising coupling said second terminal to an input of a utilization device via a capacitor.

8. A method as recited in claim 6 further comprising:
   providing a further composite video signal; and
   selectively applying said first named composite video output signal and said further composite video output signal to an input of a utilization means.

9. A signal combiner, comprising:
   a first source for providing a chrominance component signal;
   a second source for providing a luminance component signal;
   a filter network having first terminal coupled to receive said chrominance signal component; having a second terminal coupled to receive said luminance signal component, and having circuit means coupled to said first and second terminals for filtering and combining said component signals to form a composite video output signal at a given one of said first and second terminals.

10. A signal combiner as recited in claim 9 wherein said circuit means includes a filter having a given filtering characteristic for one of said component signals and having a different filtering characteristic for the other of said component signals.

11. A signal combiner as recited in claim 9 wherein said filter network includes a third terminal for receiving a source of reference potential and said circuit means comprises an inductor and a capacitor coupled in series between said first and second terminals and first and second resistors coupled between respective ones of said first and second terminals and said third terminal.

12. A signal combiner as recited in claim 9 wherein said composite video output signal is formed at said second terminal to which said luminance component signal is applied and further comprising utilization means coupled to said second terminal for utilizing said composite video output signal.

* * * * *